United States Patent [19]

Eue et al.

[11] Patent Number: 4,594,681
[45] Date of Patent: Jun. 10, 1986

[54] DATA PROCESSING SYSTEM SAFETY OUTPUT CIRCUITS

[75] Inventors: Wolfgang Eue, Brunswick; Horst Strelow, Cremlingen, both of Fed. Rep. of Germany

[73] Assignee: Siemens Aktiengesellschaft, Berlin & Munich, Fed. Rep. of Germany

[21] Appl. No.: 415,602

[22] Filed: Sep. 7, 1982

[30] Foreign Application Priority Data

Sep. 21, 1981 [DE] Fed. Rep. of Germany ....... 3137450

[51] Int. Cl.[4] .............................................. G06F 11/16
[52] U.S. Cl. ....................................... 364/900; 371/68
[58] Field of Search ... 364/200 MS File, 900 MS File; 371/68

[56] References Cited

U.S. PATENT DOCUMENTS 4,012,717  3/1977  Censier et al. ...................... 364/900
4,149,069  4/1979  Strelow .................................. 235/307
4,400,792  8/1983  Strelow .................................. 364/900

*Primary Examiner*—Thomas M. Heckler
*Attorney, Agent, or Firm*—Hill, Van Santen, Steadman & Simpson

[57] ABSTRACT

In a plural channel safety output circuits, for example for railway safety purposes, binary signals of a pair of data lines are fed to two trigger elements each of which control a respective gate stage. These two gate stages receive clock pulses from a clock pulse generator which provide control for the entire data processing system. The signals emitted from the gate stages are monitored by a common equivalence monitoring element such that when the signal pairs at the outputs of the two gate stages are alike, the equivalence monitoring element passes test pulses released by the clock pulse generator back to the clock pulse generator to maintain the clock pulse supply. These test pulses also control a voltage source which is dependent upon them, and which supplies energy to at least one switching element in one of the two output channels. A fail-safe amplifier can be connected to at least one of the gate stages.

15 Claims, 1 Drawing Figure

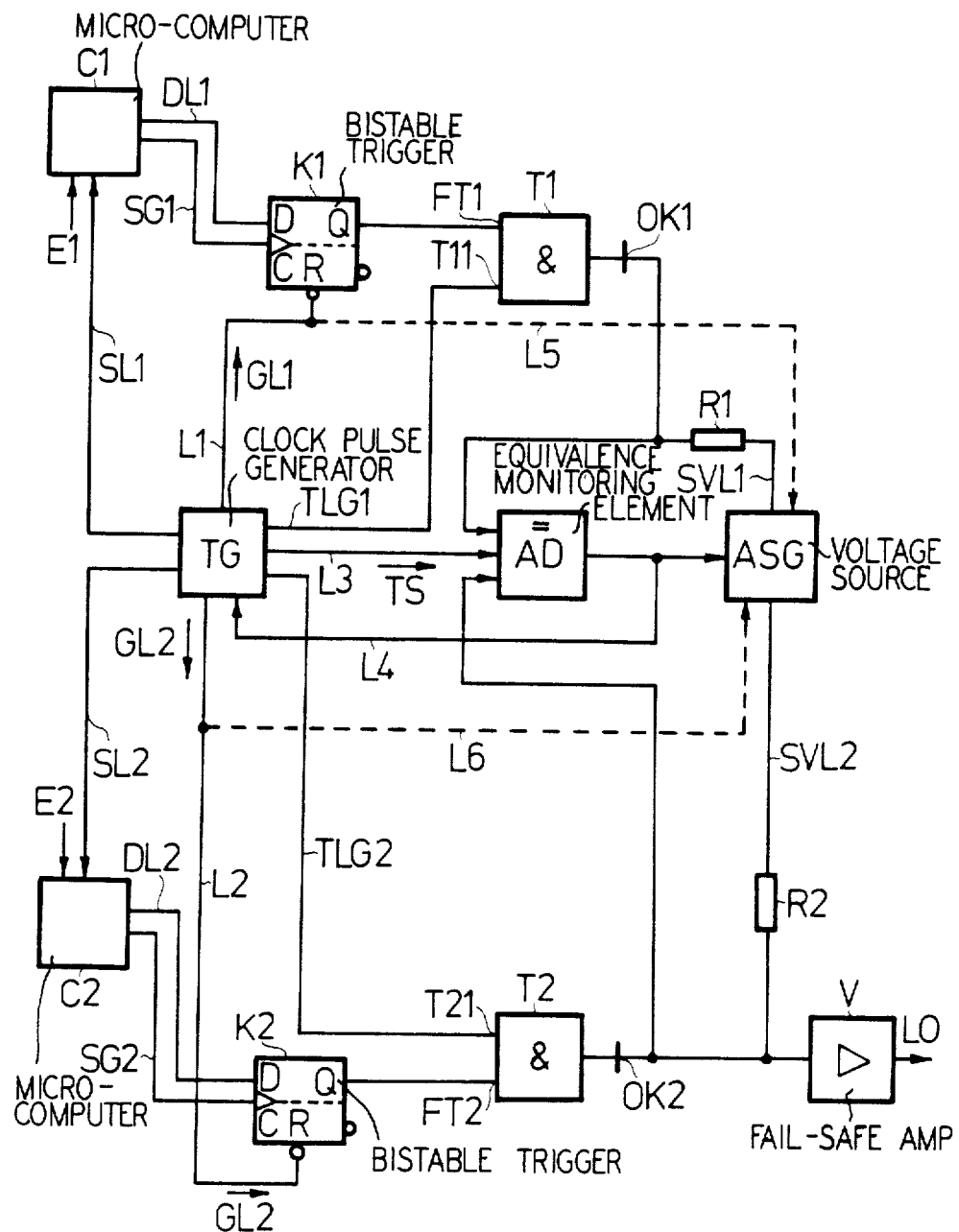

DATA PROCESSING SYSTEM SAFETY OUTPUT CIRCUITS

BACKGROUND OF THE INVENTION

The invention relates to data processing system safety output circuits which monitor plural binary signals. A clock pulse generator is employed to control a gate stage for each signal path. Monitoring is provided to check correct equivalence of the signals.

In many technical areas, electronic switching units are being used to an increasing extent for the control of alternating sequence processes. These include in particular many devices which are now in common commercial use, such as microcomputers. These devices and other process computers cannot be readily applied to railway traffic safety systems or to the safeguarding of nuclear installations. In these system applications, special demands are made on the reliability of the data processing. Human lives may be dependent upon the correct operation of these systems. As a rule such systems are constructed in such a way as to ensure that component faults should never result in jeopardizing safe operation, but only lead at the most to inhibition of operation. With respect to railway safety this means that there is always a switch-over to a lower energy level upon any malfunction, so that, for example, the speed of a train is reduced, or a departure is cancelled. In this way, in the event of any sort of fault in the controlling devices, it is possible to bring these into a state which prevents harm to human beings or damage to machines.

In order to be able to recognize a fault within a switching unit promptly, it is possible to use double channel systems or plural channel systems. In the case of double systems emplying safety output circuits of the type described in the introduction, the control mechanisms are constructed in such a way that when a deviation occurs within one of two channels, the associated clock pulse supply is immediately disconnected so that no signals likely to result in any danger can be emitted.

Double systems of this kind can consist of a single micro-computer which in operation facilitates a two-channel output by means of diversity programs. However a multi-channel data processing system can consist of separate micro-computers which each process the same items of information.

A typical data processing system safety output circuit of the type described in the introduction is described in U.S. Pat. No. 4,149,069, incorporated herein by reference. It is particularly suitable for control units responsible for safety, e.g. in nuclear material medical fields, so that in the event of a defect, radiation output is interrupted. In motor car control systems it is possible to construct a reliable radar controlled distance warning system or a reliable control for skid-free braking. The known safety output circuit can also be used in traffic light control systems, large-scale chemical processes, rolling mill control systems, power station control systems, and in controlling nuclear processes. In the known safety output circuit the switching components which possess storage and logic-linking facilities are not required to be constructed in accordance with fail-safe principles, so that normal, commercially available circuit components are sufficient. However in more sophisticated systems comprising a plurality of output channels, the increased number of circuit components required for output require a relatively large amount of space.

SUMMARY OF THE INVENTION

An object of the present invention is to further develop a safety output circuit of the type described in the introduction for at least one unit featuring diversity programs to provide two-channel output, or for a two-channel or multi-channel data processing system using separate units. In the case of a plurality of pairs of output signals, there is a reduction in the number of modules comprising highly integrated circuitry and therefore in the space requirement. Furthermore an additional safety element is to be provided in addition to control of the clock pulse supply.

In accordance with the present invention there is provided a data processing system safety output circuit for checking plural binary signals. The circuit comprises a clock pulse generator controlling a respective gate stage for each of the binary signal paths, and which is fed by respective storage elements. Each of the gate stages has its output connected to a comparator circuit to which interrogation test pulses are supplied from the clock pulse generator only in the event of a correct comparison result. Pulses from the generator are fed to each said gate stage to produce an output if an output signal is applied from the associated storage element. Each such output is fed to a respective input of the comparator circuit. The test pulses passed by the comparator circuit are also fed to control a voltage source to supply energy to an output circuit driven by the outputs of the gate stages.

Advantageously, each gate stage consists of an AND gate having an open-collector output connected via a load resistor to the d.c. voltage source. This embodiment of the invention particularly complies with the need for a compact construction, since a large number of AND gates may be assembled in the form of a single integrated circuit chip.

In a preferred embodiment the gate stage can also consist of a three-state driver stage whose data input is connected to an output of the assigned storage element, whose release input is connected to the clock pulse generator, and whose output is connected via a load resistor to the voltage source which is dependent upon the test pulses.

In another advantageous embodiment, the three-state driver stage can be used in a somewhat different circuit. Its release input is connected to the associated storage element and its data input is connected to the clock pulse generator. In this case, the three-state driver stage is supplied with current from the voltage source when the test pulses are fed thereto.

If it is desired to increase the binary signals to a higher energy level, advantageously the binary signals can be output indirectly via a fail-safe amplifier provided in one signal channel path and controlled by the associated gate stage.

A particularly advantageous embodiment provides that the gate stages of both channels of a channel pair are each connected to an amplifier which controls a relay. Contacts of the two relays of each channel pair form an equivalence circuit whose output is connected to the data processing system and where additional contacts of both relays form the output of the circuit.

An advantage of this embodiment is that no fail-safe amplifiers are needed. In all the embodiments of the invention which employ additional amplifiers, it is particularly favorable for safety purposes that the amplifiers are supplied with energy by the voltage source which, is dependent upon the test pulses.

BRIEF DESCRIPTION OF THE DRAWING

The drawing illustrates a block schematic circuit diagram of a preferred exemplary embodiment of the invention.

DESCRIPTION OF THE PREFERRED EMBODIMENTS

A two-channel data processing system consists of two micro-computers C1 and C2, which are assigned a common clock pulse generator TG. For reasons of safety two separate microcomputers, C1 and C2, process the same items of information clocked synchronously. The items of information to be processed in the two micro-computers C1 and C2 are supplied via respective input lines E1 and E2. In practice a plurality of input lines may be needed to form an input bus. This also applies to lines SL1 and SL2, via which the two micro-computers C1 and C2 are supplied with the clock pulses required for operation, and conceivably their output lines DL1 and DL2 may each be formed by a respective bus feeding separate channel paths. In this exemplary embodiment the binary signals are to be emitted from the gate stages, not directly, but rather indirectly via a failsafe amplifier V at the channel path output L0. A fundamental feature of the safety output circuit is that the fail-safe amplifier V should be operated by fault-resistant signals so that it is always ensured that process-activating signals are never unintentionally fed out via a line L0.

To avoid encumbering the drawing with unnecessary lines, only one output line DL1 and DL2 is shown connected to each of the two micro-computers C1 and C2 respectively. These two lines form a channel pair. Via this channel pair, in the event of regular operation, identical binary signals either featuring the logic value "0" state or the logic value "1" state are fed out. Two memories, which in the preferred embodiment are bistable trigger elements, K1 and K2 respectively, are provided for the transfer of binary signal pairs from the channel pair DL1/DL2. In the exemplary embodiment these are D-type flip-flop elements. They can also consist of trigger elements of shift registers. The D-input of the trigger element K1 is connected to the output line DL1. The D-input of the trigger element K2 is connected to the output line DL2. The clock pulse input C of each trigger element K1, K2 is connected via a respective control signal line SG1 and SG2 to the respective micro-computers C1 and C2. In this way, binary signal pairs can be transferred from the micro-computers C1 and C2 across the output lines DL1 and DL2 with control of the clock pulse edges. In addition, it should be noted that the output lines DL1 and DL2, and the control signal lines SG1 and SG2, are connected to the relevant bus lines of the associated microcomputers, C1 and C2 respectively.

A reset input R of each trigger element K1 and K2 is connected to the clock pulse current supply TG via a respective line, L1 and L2. In this way at a given time it is possible to supply return-to-normal signals, GL1 and GL2, each having the logic value "0" state in order to reset the trigger elements K1 and K2. This is necessary for example in order to set up a starting position of the safety output circuit. The outputs Q of the trigger elements K1 and K2 are connected to electronic switches, which in the preferred embodiment are the release inputs FT1 and FT2 of respective gate stages T1 and T2. The second input T11 and T21 of each gate stage T1 and T2 is connected to the clock pulse generator TG via respective lines TLG1 and TLG2, which supply clock pulse signals. In another embodiment the lines TLG1 and TLG2 can also supply signals which are suitable to enable the gate circuits to transmit pulse sequences of the trigger elements. The gate stages T1 and T2 preferably each consist of an AND gate which possesses an open-collector output which is connected via a load resistor, R1 and R2 respectively, and via respective lines SVL1 and SVL2, to a voltage source ASG which is dependent upon test pulses TS to be described. Vertical lines OK1 and OK2 respectively at the outputs of the gate stages T1 and T2 indicate that each gate stage is an AND gate which possesses an open-collector output. When the associated trigger element K1 or K2 is reset the following gate stage T1 or T2 is blocked, so that the clock pulse signals fed via the respective input T11 or T21 are not switched through. At this time the outputs of the two gate stages T1 and T2 carry a constant continuous signal, which should be considered as a process inhibiting signal in this safety output circuit.

The comparator circuit for the binary signals emitted via the gate stages T1 and T2 consists in this embodiment of an equivalence monitoring element AD, which is not only connected to the outputs of the two gate stages T1 and T2, but is also connected via a line L3 to the clock pulse generator TG. Via the line L3 the clock pulse generator TG emits test pulses TS which, when an equal valued and thus correct binary signal pair is present at the outputs of the two gate stages T1 and T2, are fed through by the equivalence monitoring element AD, and returned via a line L4 to the clock pulse generator TG, to maintain the clock pulse supply until a next test pulse TS is fed out. This form of circuit construction means that the clock pulse generator TG is immediately disconnected or inhibited in the event of an equivalence fault, so that the two micro-computers C1 and C2 become inoperable. This in turn means that no signals made available via the channel pair formed by lines DL1 and DL2 result in a danger situation. In the absence of clock pulse signals on the lines TLG1 and TLG2, the gate stages T1 and T2 are unable to emit any signals likely to be evaluated as process activating at the receiving end. Here it should be briefly mentioned that in addition to its fail-safe function, with its design as an a.c. amplifier with d.c. isolation of its output circuit from its input circuit, the amplifier V also represents a selective receiver for the output signals of the gate stages. With respect to this exemplary embodiment this means that only in the presence of a flow in and flow out minimum current of a predetermined frequency with a minimum voltage range does the amplifier V respond, and thus supply process activating signals via the output line or bus LO.

The test pulses TS passed through the equivalence monitoring elements AD additionally control the voltage source ASG, which is designed as a non self-sustained transducer circuit, or a simple retriggerable monostable trigger element. The use of a voltage source ASG of this kind means that in the absence of test signals TS at the output of the equivalence monitoring element AD, no energy is fed via the lines SVL1 and SVL2. This in turn means that in the event of a defect, the positive input current required to enable the amplifier V to feed out active signals to the output LO is not reached.

For reasons of safety the voltage source ASG which emits energy only in the event of regular operation can also be used to supply additional circuit components, e.g. the amplifier V.

Depending upon the design of the voltage source ASG, in order to bring about a given basic setting it can be advantageous to supply at least one of the return-to-normal signals fed via lines GL1 and GL2 to the voltage source ASG via a corresponding line, L5 and/or L6 (shown in broken lines).

In a practical embodiment, a plurality of channel pairs will be connected to the micro-computers C1 and C2. In practice this also necessitates a corresponding number of equivalence monitoring elements AD whose inputs and outputs are then connected in series for the transfer of test pulses. In this way the required equivalence monitoring elements form a series circuit and the equivalence monitoring element occupying the last position is finally connected by its output to the clock pulse current supply TG and to the voltage source ASG.

In the following an overall survey of the mode of operation of the safety output circuit will be briefly considered. When the return-to-normal signals GL1 and GL2 each possess the logic "0" state on the lines L1 and L2, the trigger elements K1 and K2 are reset to an identical starting switching state, which is significant with respect to starting of the safety output circuit. In this aforementioned starting switching state, the two trigger elements K1 and K2 block the following gate stages T1 and T2 via their respective Q-outputs, as in this state their outputs carry constant signals of the logic "0" state irrespective of the voltage source ASG. At this time the equivalence monitoring element AD receives equivalent signals, and therefore allows the passage of a supply test pulse TS. Up until now the amplifier V receives no dynamic control signals, so that no process activating signals can be emitted via the output LO.

Following the return via the line L4 of the first test pulse TS which has been fed to the equivalence monitoring element AD from the clock pulse generator TG, the switch-on phase of the overall circuit comes to an end with the discontinuation of the return-to-normal signals on lines GL1 and GL2. Previously the voltage source ASG, which is dependent upon the test pulses, develops its output voltages for the lines SVL1 and SVL2, since during the return-to-normal signals on lines GL1 and GL2, the test pulse TS transmitted by the equivalence monitoring element AD was present. Following this switch-on phase the voltage source ASG emits energy only for such time as test pulses transmitted by the equivalence monitoring element AD are regularly received. When the voltage source ASG is in operation, a constant signal of the logic "0" state continues to occur at the output of the gate stages T1 and T2 in the blocked state in accordance with the AND function.

If the micro-computers C1 and C2 now emit signals of the logic "0" state via their respective output lines DL1 and DL2, no change occurs in the switching state of the trigger elements K1 and K2 or in the switching state of the two gate stages T1 and T2. The outputs of the gate stages T1 and T2 also continue to carry a low potential.

On the other hand, if the output lines DL1 and DL2 carry binary signals of the logic "1" state, these values are received by the assigned trigger elements K1 and K2, which now change into the other switching state. Then the Q-output of each of the trigger elements K1 and K2 emits the logic "1" state and the following gate stages T1 and T2 are capable of transmitting the clock pulse signals received on the lines TLG1 and TLG2 respectively. This results in the fact that the output signals of the gate stages T1 and T2 follow the timing of the supplied clock pulse signals. The amplifier V is adapted to the timing of the clock pulse signals, and so reacts to emit process activating signals via the line L0.

If, at any point in time, the micro-computers C1 and C2 again emit signals of the logic "0" state via their output lines DL1 and DL2, the safety output circuit returns to the basic state described initially in which a constant low potential again prevails at the input of the amplifier V and the output LO again carries process inhibiting signals.

If during operation only one of the two microcomputers C1 and C2 should operate in faulty fashion, and thus impermissibly change the switching state of the assigned trigger element K1, K2, the two gate stages T1 and T2 are differently operated. Thus in this case one of the gate stages T1, T2 would be opened, whereas the second would be blocked. On account of the electrical asymmetry which then prevails at this time, the following test pulse fed to the equivalence monitoring element AD is no longer passed forward. The clock pulse generator TG reacts to the fact that the test pulse is not returned back and ceases to emit clock pulse signals. As a consequence, the voltage source ASG, which is dependent upon the test pulses, is disconnected. Since the amplifier V is then only supplied with a low d.c. potential, no further process activating signals can be emitted via the output LO.

As the clock pulse generator TG determines the time of the testing of equivalence by the time state of the test pulses TS relative to the other clock pulse signals, it is possible for the two microcomputers C1 and C2 to be operated by staggered clock pulse trains. This form of operation of the microcomputers C1 and C2 is advantageous, in as much as exterior faults will then be manifest sufficiently differently to result in an equivalence fault, and thus to disablement of the safety output circuit. A special form of clock-pulse-staggered operation consists in the use of only one micro-computer, which controls the trigger elements K1 and K2 consecutively in a sequential manner.

The micro-computers C1 and C2 can be of mutually different construction, and in fact hard-ware and/or soft-ware diversity is possible. The clock pulse generator design will be varied accordingly.

In a modified embodiment of the safety output circuit it is possible to design the clock pulse generator TG in such manner that only after a plurality of test pulses have failed to appear does an overall disconnection take place. This delayed disconnection can advantageously be extended to the voltage source ASG, which is dependent upon the test pulses.

Although various minor modifications may be suggested by those versed in the art, it should be understood that we wish to embody within the scope of the patent granted hereon, all such modifications as reasonably and properly come within the scope of our contribution to the art.

What we claim is:

1. A data processing system safety output circuit for checking binary signals of a pair of binary signal paths, comprising: a pulse generator means for providing test pulses and clock pulses and including means for inhibiting clock pulses when test pulses are not received at a test pulse input; a memory means for transferring binary signals and a switch means connected to an output of the memory means in each binary signal path; each switch means having an output connected to a respective input of a comparator circuit means, said comparator circuit means being connected to receive said test pulses from the pulse generator means, said comparator circuit means emitting test pulses back to the test pulse input of the pulse generator means given a proper comparison of the signals from the switch means; each of said switch means emitting an output signal when both a clock pulse from the pulse generator means and an output signal from the memory means is received; and test pulses from the comparator circuit means also being coupled to a control means.

2. A safety output circuit according to claim wherein said control means comprises a voltage source and said switch means each comprise a gate stage.

3. A safety output circuit as claimed in claim 2 in which each of said gate stages comprises an AND gate having an open-collector output connected via a load resistor to said voltage source.

4. A safety output circuit as claimed in claim 2 wherein each memory means comprises a bistable trigger, each gate stage comprises a three-state driver stage whose date input is connected to an output of the respective memory means, a release input of the bistable trigger being connected to the pulse generator means, and an output of the bistable trigger being connected via a load resistor to the voltage source.

5. A safety output circuit as claimed in claim 2 wherein each gate stage comprises a three state driver stage having a release input connected to the associated memory means and having a data input connected to the pulse generator means, the three state driver stage being supplied with current from said voltage source when test pulses are fed thereto from the comparator circuit means.

6. A safety output circuit as claimed in claim 2 wherein a fail-safe amplifier is provided in one of said binary signal paths and in connected to be controlled by an associated gate stage, said fail-safe amplifier having a binary signal output.

7. A safety output circuit as claimed in claim 2 wherein each gate stage is connected to an amplifier which controls a relay, contacts of the two relays of each binary signal path forming an equivalence circuit whose output is connected to a data processing system and where further contacts of the two relays form the output of the circuit.

8. A safety output circuit as claimed in claim 2 wherein an output circuit driven by outputs of said gate stages comprises an amplifier supplied with energy by the voltage source in accordance with the test pulses.

9. A safety output circuit for use in a data processing system wherein two binary signal data channels are provided, comprising: for each data channel, memory means being provided for transferring binary signals; each of said memory means being connected to a respective switch means; a pulse generator means for creating test pulses and clock pulses connected to each of the switch means; the pulse generator means also having means for inhibiting clock pulses when test pulses are not received at a test pulse input; signals emitted from the switch means being connected to an equivalence monitoring means such that when signals at the outputs of the two switch means are alike, the equivalence monitoring circuit passes test pulses corresponding to the test pulses released by the pulse generator means back to the test pulse input of the pulse generator means to maintain a supply of the clock pulses for the switch means; and a voltage source means controlled by the test pusles from the equivalence monitoring circuit for supplying energy to at least a portion of the safety output circuit.

10. A circuit according to claim 9 wherein the voltage source means supplies energy to the memory means in accordance with the test pulses fed to the voltage source means.

11. A circuit according to claim 9 wherein the voltage source means supplies energy to an output circuit in accordance with the test pulses fed to the voltage source means.

12. A circuit according to claim 9 wherein the voltage source means supplies energy to the switch means in accordance with the pulses fed to the voltage source means.

13. A circuit according to claim 9 wherein the memory means comprises a bistable trigger.

14. A circuit according to claim 9 wherein the memory means comprises a shift register.

15. A circuit according to claim 9 wherein each of the switch means comprises and AND gate.

* * * * *